United States Patent [19]

Bogaert et al.

[11] Patent Number: 5,079,047

[45] Date of Patent: Jan. 7, 1992

[54] RADIATION-CURABLE PRESSURE-SENSITIVE ADHESIVE HAVING IMPROVED ADHESION TO PLASTICIZED VINYL SUBSTRATES

[75] Inventors: Yvan A. Bogaert, Gent; Martine H. A. Deketele, Herselt, both of Belgium

[73] Assignee: Minnesota Mining and Manufacturing Company, St. Paul, Minn.

[21] Appl. No.: 351,085

[22] Filed: May 12, 1989

[51] Int. Cl.$^5$ .................. B32B 27/08; C09J 7/02; C08F 20/16; C08F 261/04

[52] U.S. Cl. .................... 428/41; 428/345; 428/352; 428/518; 428/520; 522/116; 522/120; 522/121; 525/301; 525/305; 525/309; 525/283; 526/931

[58] Field of Search ............... 522/116, 120, 121; 428/345, 352, 41; 526/931

[56] References Cited

U.S. PATENT DOCUMENTS

| | | | |
|---|---|---|---|
| 4,045,600 | 8/1977 | Williams | 427/379 |
| 4,212,912 | 7/1980 | Wartusch et al. | 428/209 |
| 4,272,573 | 6/1981 | Ewald et al. | 428/40 |
| 4,284,681 | 8/1981 | Tidmarsh et al. | 428/246 |
| 4,303,485 | 12/1981 | Levens | 204/159.24 |
| 4,379,201 | 4/1983 | Heilmann et al. | 428/345 |
| 4,605,592 | 8/1986 | Paquette et al. | 428/334 |
| 4,710,536 | 12/1987 | Klingen et al. | 524/493 |
| 4,749,590 | 6/1988 | Klingen et al. | 427/54.1 |
| 4,753,846 | 6/1988 | Mudge | 428/343 |
| 4,818,610 | 4/1989 | Zimmerman et al. | 428/345 |

FOREIGN PATENT DOCUMENTS

| | | |
|---|---|---|
| 150978 | 7/1985 | European Pat. Off. . |
| 46-4839 | 2/1971 | Japan . |
| 2162191A | 12/1966 | United Kingdom . |
| 1051125 | 1/1986 | United Kingdom . |

OTHER PUBLICATIONS

*Journal of Plastic Film and Sheeting,* vol. 2, Apr., 1986, pp. 95-110, "Materials for Adhesives", B. F. Goodrich, Mar. 1981.

Chemical Abstracts, vol. 76, 1972, No. 2, p. 37, Mori, "Adhesive Containing—", Abstract #4627b.

*Primary Examiner*—Marion E. McCamish
*Assistant Examiner*—Arthur H. Koeckert
*Attorney, Agent, or Firm*—Gary L. Griswold; Walter N. Kirn; Gregory A. Evearitt

[57] ABSTRACT

The current invention provides a photopolymerized pressure-sensitive adhesive which adheres well to all common surfaces and has an outstanding ability to bond to plasticized vinyl substrates and to remain firmly bonded thereto even after the in contact therewith for extended periods of time comprising the photopolymerization reaction product of a mixture containing about: 60-95 parts of alkyl acrylate; 5-40 parts monoethylenically unsaturated polar copolymerizable monomer; 10-30 parts ethylene vinylacetate copolymer containing about 40% to 70% vinylacetate; and 0.1-1 part photoinitiator.

13 Claims, No Drawings

RADIATION-CURABLE PRESSURE-SENSITIVE ADHESIVE HAVING IMPROVED ADHESION TO PLASTICIZED VINYL SUBSTRATES

BACKGROUND OF THE INVENTION

This invention relates to normally tacky and pressure-sensitive adhesive compositions and to pressure-sensitive adhesive tapes made therewith. The invention is particularly concerned with pressure-sensitive adhesive products capable of adhering firmly to plasticized vinyl substrates, both initially and after contact over an extended period of time.

Polyvinyl chloride (or, as it is more commonly referred to, "vinyl") is one of the most versatile and widely used synthetic polymers available today. In its unmodified form, it is rigid and capable of being fabricated into containers, structural components, tubing, etc. When compounded with a plasticizer, it can be calendered into flexible sheet material that can be used as upholstery fabric, floor covering, pressure-sensitive adhesive tape backing, rainwear, etc., or extruded as electrical insulation, auto body side moulding, etc. Plasticized vinyls typically contain 15–50% by weight of either a monomeric or a polymeric plasticizer; because the monomeric plasticizers are less expensive, they are more commonly employed. Unfortunately, however, the monomeric plasticizers are of relatively low molecular weight, tending not only to migrate to the surface of the plasticized vinyls but also to volatilize therefrom, gradually embrittling the originally flexible product.

The tendency of a plasticizer to migrate into materials with which it comes in contact is also well known; see, e.g., U.S. Pat. No. 4,284,681. Thus, when a pressure-sensitive adhesive is applied to a plasticized vinyl substrate and allowed to remain in contact with it for an extended period of time, plasticizer from the vinyl tends to migrate into the pressure-sensitive adhesive, softening it and causing a decrease in adhesion; see, e.g., U.K. Pat. No. 1,051,125. Attempts have been made to solve the plasticizer migration problem by interposing an impenetrable barrier between the vinyl and the pressure-sensitive adhesive; see, e.g., U.S. Pat. Nos. 4,045,600 and 4,605,592. Others have developed pressure-sensitive adhesives that are said to be less susceptible to weakening by plasticizer; see, e.g., Graziano et al, Development of Acrylic Latex Pressure Sensitive Adhesive for Plasticized PVC films, *Journal of Plastic Film & Sheeting*, Vol. 2, Apr. 1986, pp. 95–110. A commercially available tape that is widely used for adhering to plasticized vinyl utilizes a pressure-sensitive adhesive that is a terpolymer of 2-ethyl hexyl acrylate, vinyl acetate, and ethyl acrylate.

Another attempt to prevent migration of plasticizer from a plasticized vinyl substrate into a confronting pressure-sensitive adhesive has been to incorporate plasticizer into the pressure-sensitive adhesive, thereby minimizing the plasticizer gradient between the contacting layers; see, e.g., U.S. Pat. No. 4,272,573, U.K. Pat. App. 2,162,191-A, and European Pat. App. 150,978.

U.S. Pat. No. 4,753,846, issued June 28, 1988, discloses adhesive compositions suitable for application to plasticized vinyl comprising 30–70% of a vinyl ester or an alkenoic acid, 10–30% by weight ethylene, 20–40% by weight of a di-2-ethylhexyl maleate or di-n-octyl maleate or fumarate, and 1–10% of a mono-carboxylic acid.

Despite the limited success achieved by products of the type discussed in preceding paragraphs, there has remained a strong commercial desire for a pressure-sensitive adhesive that was more effective, particularly one that not only initially adhered strongly to plasticized vinyl but which also retained a high degree of adhesion after remaining in contact with it for extended periods of time.

Applicant has now discovered that certain acrylic copolymers comprising an alkyl acrylate monomer and a polar vinyl monomer photopolymerized in mixture with an ethylene vinylacetate copolymer has surprising adhesion on plasticized substrates, including plasticized vinyl.

SUMMARY OF THE INVENTION

The current invention provides a photopolymerized presssure-sensitive adhesive which adheres well to all common surfaces and has an outstanding ability to bond to plasticized vinyl substrates and to remain firmly bonded thereto even after remaining in contact therewith for extended periods of time, comprising an acrylic copolymer and a ethylene vinylacetate copolymer or mixture of vinylacetate copolymers.

The invention comprises a polymer of monomers comprising from about 60 to about 95 parts by weight of acrylic acid ester of nontertiary alkyl alcohol containing 4–14 carbon atoms, such as butyl acrylate, or especially isooctyl acrylate or isononyl acrylate, and from about 5 to about 40 parts by weight of a monoethylenically unsaturated copolymerizable monomer, such as acrylic acid, acrylonitrile, acrylamide, N-vinyl pyrrolidone, N-vinyl caprolactam, and the like. Photopolymerized in admixture with the copolymerizable monomer, in an amount suitable to achieve the desired degree of pressure-sensitive adhesion while maintaining a coatable viscosity, is an ethylene vinylacetate (EVA) copolymer or mixture thereof. Pressure-sensitive adhesives of the invention comprise from about 10 to about 30 parts by weight of the EVA or a mixture thereof, per 100 parts of the acrylic copolymer.

In most cases, the pressure-sensitive adhesive will be in the form of a thin layer carried by a backing to which it may be either permanently or temporarily adhered. Where the pressure-sensitive adhesive is permanently adhered, the resultant product is a normally tacky pressure-sensitive adhesive tape. Where the backing is provided with a release coating, the pressure-sensitive adhesive is in the form of a so-called transfer tape.

DETAILED DESCRIPTION

The acrylate monomers contain at least one alkyl acrylate monomer, preferably a monofunctional unsaturated acrylate ester of non-tertiary alkyl alcohol, the molecules of which have from about 4 to about 14 carbon atoms. Such monomers include, e.g., isooctyl acrylate, 2-ethyl hexyl acrylate, isononyl acrylate, decyl acrylate, dodecyl acrylate, butyl acrylate, and hexyl acrylate. The acrylic copolymers preferably contain from about 60 to about 95 parts of the alkyl acrylate monomer, more preferably from about 60 to about 75 parts. The alkyl acrylate monomers are copolymerized with at least one strongly or moderately polar copolymerizable monomer, preferably a moderately polar nitrogen-containing vinyl monomer.

Strongly polar monomers useful herein include acrylic acid, itaconic acid, hydroxyalkyl acrylates, cyanoalkyl acrylates, acrylamides, and substituted acrylamides; moderately polar monomers useful herein include nitrogen containing vinyl monomers such as N-vinyl pyrrolidone, N-vinyl caprolactam, acrylonitrile, and vinyl chloride.

When strongly polar monomers are used, they preferably comprise up to about 10 parts of the acrylic copolymer; when moderately polar monomers are used, they preferably comprise from 15 to 35 parts of the acrylic copolymer. N-vinyl pyrrolidone is especially preferred.

Ethylene vinylacetate copolymers useful in compositions of the invention include copolymers having varying amounts of vinylacetate, e.g., from about 40% to 70%. 70%. Commercially available copolymers include Levapren 408 (40% vinylacetate), Levapren 450 (45% vinylacetate), Levapren 452 (45% vinylacetate), Levapren KA 8422 (50% vinylacetate), Levapren KA 8385 (60% vinylacetate) and Levapren KA 8338 (70% vinylacetate), all available from Bayer Aktiengelleschaft.

Preferably, the reaction mixture utilized in the invention contains from about 10 to about 30 parts by weight of the ethylene vinyl acetate copolymer, more preferably from about 15 to about 25 parts by weight per 100 parts of alkyl acrylate and polar copolymerizable monomer.

The mixture of the ethylene vinylacetate copolymer and the polymerizable monomers also contains a photoinitiator to induce polymerization of the monomers. Photoinitiators which are useful include the benzoin ethers such as benzoin methyl ether or benzoin isopropyl ether, substituted benzoin ethers such as anisole methyl ether, substituted acetophenones such as 2,2-diethoxyacetophenone and 2,2-dimethoxy-2-phenylacetophenone, substituted alpha-ketols such as 2-methyl-2-hydroxypropiophenone, aromatic sulfonyl chlorides such as 2-naphthalene sulfonyl chloride, and photoactive oximes such as 1-phenyl-1,1-propanedione-2-(O-ethoxycarbonyl)-oxime. The photoinitiator is present in an amount of about 0.01 to about 1 phr of the instant pressure-sensitive adhesive compositions.

The mixture of the ethylene vinylacetate copolymer and the photopolymerizable monomers may also contain a crosslinking agent. Preferred crosslinking agents for an acrylic pressure-sensitive adhesive are multifunctional acrylates such as 1,6-hexanediol diacrylate as well as those disclosed in U.S. Pat. No. 4,379,201 (Heilmann et al.), incorporated herein by reference, such as trimethylolpropane triacrylate, pentaerythritol tetracrylate, 1,2-ethylene glycol diacrylate, and 1,2-dodecanediol diacrylate. When used, the crosslinking agent is present in an amount of from about 0.01 to about 0.5 phr.

Tapes of the invention may also have a backing or core layer. The core layer may consist of such materials as acrylates, polyethylenes, polypropylenes, neoprenes, polyolefins, polyurethanes, silicones, etc.

In a preferred embodiment, the core layer consists of an ultraviolet-radiation polymerized acrylic copolymer which may incorporate similar or dissimilar acrylic monomers in like or unlike thicknesses, having similar or different additives from those acrylic copolymers contained in the adhesive layer. The core layers preferably comprise from about 60 to about 90 parts of an alkyl acrylate monomer and correspondingly, up to about 10 parts, most preferably up to about 5 parts of a polar copolymerizable monomer selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers such as N-vinyl pyrrolidone, acrylonitrile, N-vinylcaprolactam, vinyl chloride or diallyl phthalate.

The core layer may be a foam-like layer, e.g., a monomer blend comprising microspheres may be used. The microspheres may be glass or polymeric. The microspheres should have an average diameter of 10 to 200 micrometers, and comprise from about 5 to about 65 volume percent of the core layer. The thickness of foam-like layers in preferred tapes of the invention range from 0.3 mm to about 4.0 mm in thickness.

Preferred glass microspheres have average diameters of about 80 micrometers. When glass microspheres are used, the polymeric matrix should be at least 3 times as thick as their diameter, preferably at least 7 times. The thickness of layers containing such glass microspheres should be at least six times, preferably at least twenty times that of each microsphere-free layer.

Other useful materials which can be blended into the pressure-sensitive adhesive layer or the core layer include, but are not limited to, fillers, pigments, fibers, woven and nonwoven fabrics, antioxidants, stabilizers, fire retardants, and viscosity adjusting agents.

An especially useful filler material is hydrophobic silica as disclosed in U.S. Pat. Nos. 4,710,536 and 4,749,590, (Klingen, et al.), both of which are incorporated herein by reference. In one preferred embodiment of the present invention, the pressure-sensitive adhesive layer further comprises from about 2 to about 15 phr of a hydrophobic silica having a surface area of at least 10 $m^2/g$.

The pressure-sensitive adhesive composition is preferably prepared by dissolving or dispersing the ethylene vinylacetate copolymer into the monomers, and photoinitiator. Crosslinking agent and/or other additives may also be incorporated into the syrup.

This composition is coated onto a flexible carrier web and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air using ultraviolet lamps. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens), incorporated herein by reference, which also teaches that such procedures will allow thick coatings to be polymerized in air.

Where multilayer tape constructions are desirable, a preferred method of construction is multilayer coating, as described in U.S. Pat. No. 4,818,610 (Zimmerman et al.), incorporated herein by reference, wherein a plurality of copolymerizable coatable composition is prepared, each composition containing at least one photopolymerizable monomer, one of the coatable composition being the novel pressure-sensitive adhesives of the invention. The coatable compositions are coated to provide a plurality of superimposed layers with contiguous layers defining an interface therebetween, with the novel pressure-sensitive adhesive polymer of the invention being coated as a first or last layer. Migration of photopolymerizable monomers through the interface between contiguous layers is permitted, and the superimposed layers are then simultaneously irradiated. This provides polymeric chains comprised of copolymers of photopolymerizable monomers originating from contiguous layers extending through the interface therebetween, thereby producing a tape having layers which cannot be delaminated.

In the examples that will appear below, certain test procedures were used to evaluate the ability of a given pressure-sensitive adhesive to adhere to plasticized vinyl substrates.

180° Peel Adhesion

This test is conducted in accordance with PSTC-7, a procedure specified in "Test Methods for Pressure-Sensitive Tapes", 8th Edition, available from Pressure Sensitive Tape Council, 1800 Pickwick Ave., Glenview, Ill. 60025-1377, U.S.A. A strip of tape 12.7 mm wide and about 30 cm long is adhered to a panel about 5 cm × 12.5 cm. One end of the tape is then doubled back on itself to expose about 2.5 cm at the end of the panel. This exposed end is then clamped in the upper jaws of a tensile testing machine and the doubled-back free end of the tape clamped in the lower jaws. The jaws are then separated at about 30 cm/minute. The force required to strip the tape from the panel is measured in oz/½ inch and reported as N/dm.

Plasticizer Resistance

For this test, a 180° Peel adhesion sample is set up as described in the above paragraph, using a plasticized substrate, either plasticized vinyl or a commercially available plasticized canvas containing about 40% low molecular weight plasticizers. The samples are then aged on the plasticized substrate at both room temperature and 70° C. for varying time periods from 20 minutes up to two weeks. The sample is then measured as described above.

Static Shear

This test is conducted in accordance with PSTC-7, a procedure specified in the same publication referred to above. A 12.7-mm × 10-cm strip of the tape to be tested is applied to a vertical stainless steel test panel so that a terminal 12.7-mm × 12.7-mm area is in contact. A weight of 1kg is then applied to the free end of the tape and the time to failure noted. If no failure has occurred in 10,000 minutes, the test is discontinued.

The following examples are intended to be illustrative and should not be construed as limiting the invention in any way. All parts, ratios, and percentages are by weight unless otherwise noted.

EXAMPLE 1

A pressure-sensitive adhesive tape was made by polymerizing a mixture of 71 parts by weight isooctyl acrylate (IOA), 29 parts by weight N-vinyl pyrrolidone (NVP), 25 parts by weight of an ethylene vinylacetate copolymer (available as Levapren TM KA8385 from Bayer, Leverkusen, Germany), and 0.30 parts by weight of 2,2-dimethoxy-2-phenylacetophenone (Irgacure TM 651 available from Ciba Geigy) as a photo-catalyst. The mixture was knife coated onto a 0.04 mm biaxially oriented polyethylene terephthalate (PET) film, and covered by a silicone-coated, 0.1 mm PET film, at a knife setting which was adjusted to squeeze the syrup to provide a uniform coating about 0.13 mm thick. The composite was exposed to a bank of ultraviolet lamps which provide ultraviolet radiation at a total energy of 450 mJ/cm$^2$. 180° peel and static shear were measured on this sample and the test results are listed in Table 1.

COMPARATIVE EXAMPLE 1-C

This was made similar to Example 1 except that the IOA and NVP were partially thermally polymerised by using 0.016 parts of benzoylperoxide as an initiator. The partial polymerization was accomplished in an inert atmosphere (Nitrogen) to provide a coatable syrup having a viscosity of about 500–50,000 cps. To this syrup was added 0.3 parts by weight of Irgacure 651. No ethylene vinylacetate copolymer was added. This was also cured and tested similar to Example 1 and the test results are shown in Table 1.

EXAMPLE 2

A pressure-sensitive adhesive tape was made similar to Example 1, except that Levapren TM 8422 was used as the ethylene vinyl acetate copolymer. This sample was tested as described in Example 1 and the results are shown in Table 1.

TABLE 1

| EXAMPLE | 1 | 2 | 1-C |
|---|---|---|---|
| 180° peel (N/dm) on Belgian Canvas* | | | |
| Room Temperature | | | |
| Immediately | 67 | 60 | 69 |
| 24 hours | 104 | 98 | 102 |
| 70° C. | | | |
| 24 hours | 100 | 93 | X |
| 1 week | 69 | 60 | X |
| 2 weeks | 64 | 51 | X |
| Static Shear RT (0.5" × 0.5", 1 kg) | 1957 sp | 1325 sp | 2528 sp |

*highly plasticized canvas film available from De Wit NV (Antwerp-Belgium)
X-delamination of liner

EXAMPLES 3 TO 5 AND 3-C

These were made similar to Example 1 but acrylic acid was used as comonomer in a ratio of 90/10. For samples 3 to 5, different kinds of Levapren TM EVA were used. The samples were also tested as in Example 1 and the results are given in Table 2.

TABLE 2

| EXAMPLE | 3 | 4 | 5 | |
|---|---|---|---|---|
| Levapren | 408 | KA8385 | KA8422 | 3-C |
| 180° peel (N/dm) on Belgian Canvas | | | | |
| Room Temperature | | | | |
| Immediately | 51 | 42 | 47 | 64 |
| 24 hours | 42 | 49 | 47 | 42 |
| 70° C. | | | | |
| 24 hours | 109 | 84 | 89 | 33 |
| 1 week | 67 | 64 | 62 | 27 |
| 2 weeks | 53 | 53 | 56 | 31 |
| Static Shear RT | 392 sp | 344 sp | 654 sp | 389 sp | sp-split

EXAMPLES 6, 7 AND 6-C

Examples 6, 7 and 6-C are made similar to Examples 3 and 3-C, except that 0.15% HDDA is added for crosslinking. The samples were tested as described in Example 1, and the results are given in Table 3.

TABLE 3

| EXAMPLE | 6 | 7 | |
|---|---|---|---|
| Levapren | 408 | KA8338 | 6-C |
| 180° peel (N/dm) on Belgian Canvas | | | |
| Room Temperature | | | |
| Immediately | 38 | 33 | 42 |
| 24 hours | 24 | 27 | 40 |
| 70° C. | | | |
| 24 hours | 27 | 22 | 9 |
| 1 week | 24 | 27 | 7 |
| 2 weeks | 22 | 27 | 7 |
| Static Shear RT | 9920 sp | 695 sp | 684 po | sp-split
po-popoff

EXAMPLES 8 TO 9 AND 8-C

These examples were made similar to Examples 1 and 1-C except that 0.05% HDDA is added as a crosslinking agent, and 17 parts of the ethylene vinylacetate copolymers were used. Testing of the samples is done on Duraskin ™ canvas, a highly plasticized PVC canvas film containing approximately 41% low Mw Plasticizer (available from Verseidag). The results are reported in Table 4.

TABLE 4

| EXAMPLE | 6 | 7 | |
|---|---|---|---|
| Levapren | KA8385 | KA8422 | 6-C |
| 180° peel (N/dm) on Belgian Canvas | | | |
| Room Temperature | | | |
| Immediately | 71 | 58 | 71 |
| 24 hours | 102 | 98 | X |
| 70° C. | | | |
| 24 hours | 109 | 109 | X |
| 1 week | 71 | 71 | 62 |
| 2 weeks | 67 | 67 | 42 |
| Static Shear (min) | 10000+ | 972 po | 2528 sp |

X-delamination of linear
sp-split
po-popoff

EXAMPLES 10 AND 10-C

These examples are made similar to Example 1 and 1-C, except a 66/34 ratio of IOA/NVP was used and 0.15% Irgacure ™ 651 and 25 parts Levapren ™ KA8385 were used. The samples are tested on Duraskin canvas. The results are reported in Table 5.

TABLE 5

| EXAMPLE | 10 | 10-C |
|---|---|---|
| % HDDA | 0 | 0 |
| 180° peel (N/dm) on Duraskin | | |
| Room Temperature | | |
| 20 min dwell | 96 | 70 |
| 24 hours | 99 | 103 |
| 70° C. | | |
| 24 hours | 126 | 118 |
| 3 days | 126 | 112 |

TABLE 5-continued

| EXAMPLE | 10 | 10-C |
|---|---|---|
| % HDDA | 0 | 0 |
| 1 week | 120 | 86 |
| 2 weeks | 115 | 78 |
| Static Shear (min) | 2802 sp | 775 sp | sp-split

What is claimed is:

1. A pressure-sensitive adhesive which remains firmly bonded to plasticized vinyl substrates after remaining in contact therewith over an extended period of time, said pressure-sensitive adhesive being the photopolymerization reaction product of a mixture consisting essentially of:
    (a) about 60 to 95 parts of an acrylic acid ester of a nontertiary alcohol, the alkyl groups of which contain from about 4-14 carbon atoms;
    (b) about 5 to 40 parts of a monoethylenically unsaturated polar copolymerizable monomer;
    (c) about 10-30 parts of an ethylene vinylacetate copolymer containing from about 40 to about 70% vinylacetate, based upon the total weight of said acrylic acid ester and said monoethylenically unsaturated polar copolymerizable monomer; and
    (d) about 0.1 to about 1 part photoinitiator based on the weight of said acrylic acid ester and said monoethylenically unsaturated polar copolymerizable monomer.

2. A pressure-sensitive adhesive according to claim 1 containing about 15 to 25 parts of said ethylene vinylacetate copolymer.

3. A pressure-sensitive adhesive according to claim 1 wherein said acrylic acid ester is isooctyl acrylate.

4. A pressure-sensitive adhesive according to claim 3 wherein said isooctyl acrylate comprises from about 60 to 75 parts of the total parts by weight of said acrylic acid ester and said monoethylenically unsaturated polar copolymerizable monomer.

5. A pressure-sensitive adhesive according to claim 4 wherein said polar monomer is N-vinyl pyrrolidone.

6. A pressure-sensitive adhesive tape comprising a layer of the adhesive of claim 5 carried by a sheet backing.

7. A pressure-sensitive adhesive according to claim 1 wherein said polar copolymerizable monomer is a strongly polar monomer.

8. A pressure-sensitive adhesive according to claim 7 wherein said strongly polar monomer is acrylic acid.

9. A pressure-sensitive adhesive according to claim 1 further containing a polyfunctional acrylate.

10. A pressure-sensitive adhesive according to claim 9 wherein said polyfunctional acrylate is 1,6-hexanediol diacrylate.

11. A pressure-sensitive adhesive tape comprising a layer of the adhesive of claim 1 carried on a sheet backing.

12. A pressure-sensitive tape according to claim 11 wherein the surface of said backing adjacent the adhesive is provided with a release coating.

13. A plasticized vinyl substrate having firmly adhered thereto a layer of the pressure-sensitive adhesive of claim 1.

* * * * *